No. 634,241. Patented Oct. 3, 1899.
C. KORFHAGE.
WORKMAN'S TIME RECORDER.
(Application filed Nov. 8, 1894. Renewed Feb. 18, 1899.)
(No Model.) 6 Sheets—Sheet 1.
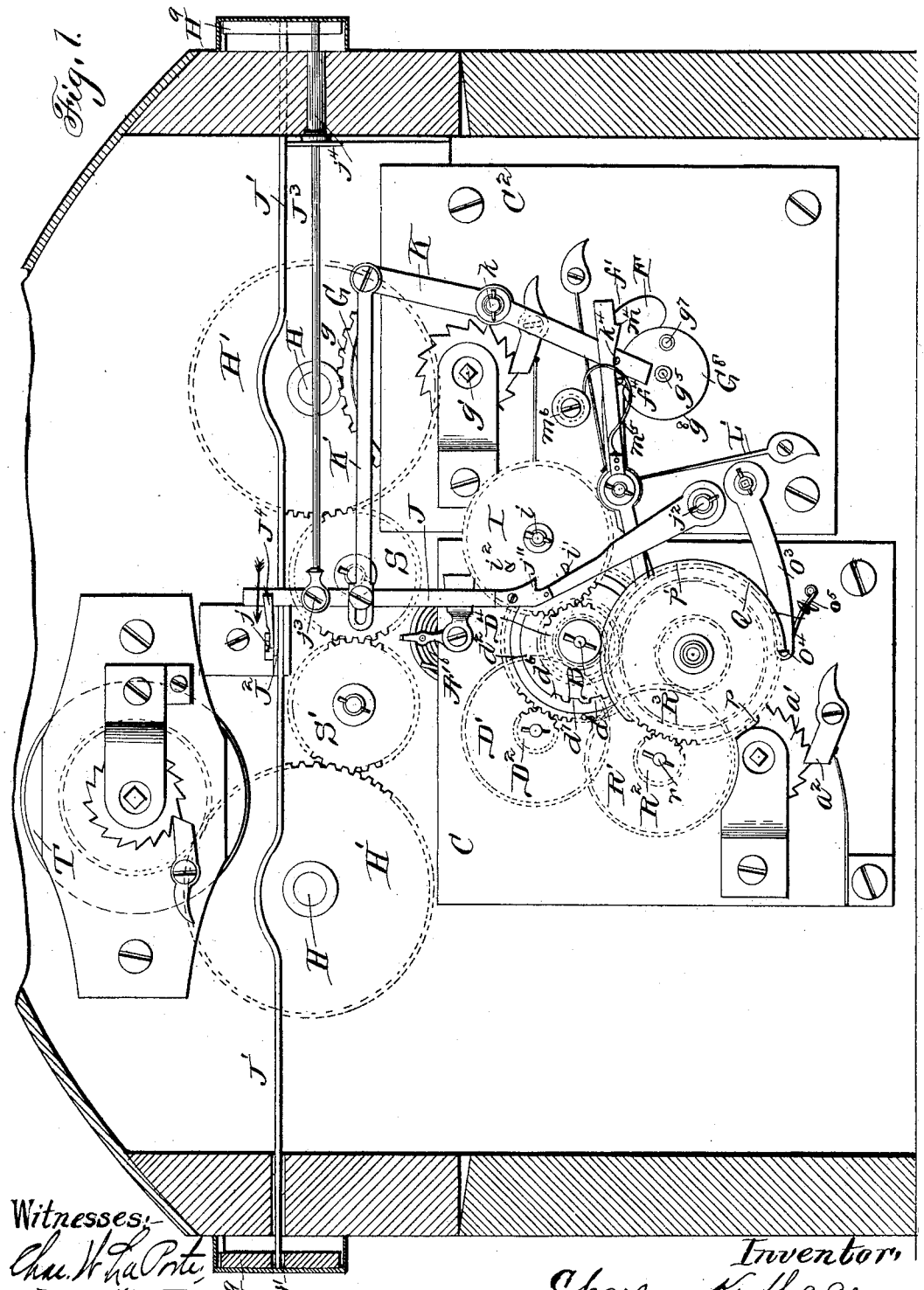
Witnesses:
Chas. W. LaPorte
W. H. Edwards
Inventor:
Charles Korfhage
by H. H. Bliss Att'y.

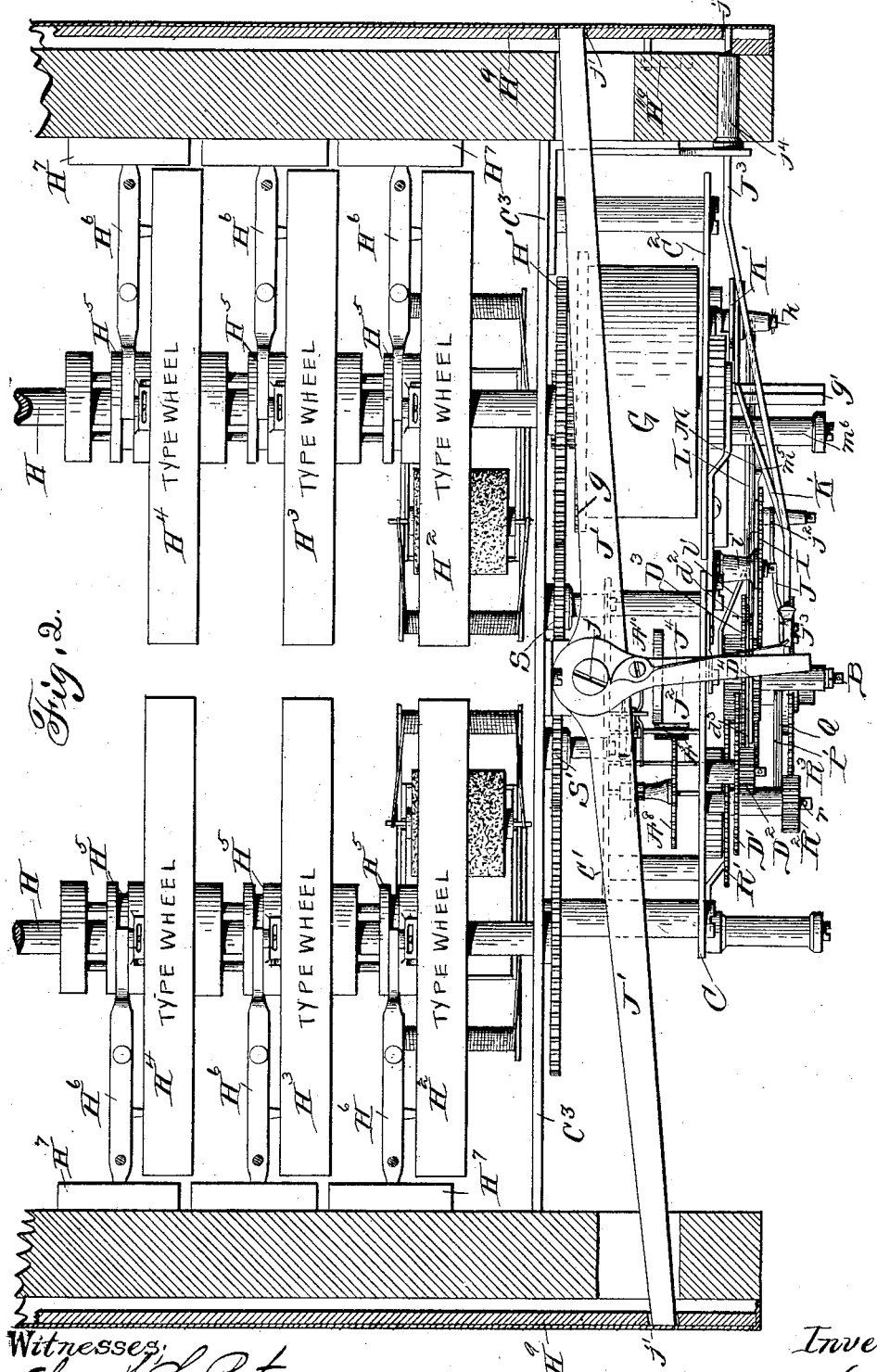

No. 634,241. Patented Oct. 3, 1899.
C. KORFHAGE.
WORKMAN'S TIME RECORDER.
(Application filed Nov. 8, 1894. Renewed Feb. 18, 1899.)
(No Model.) 6 Sheets—Sheet 3.
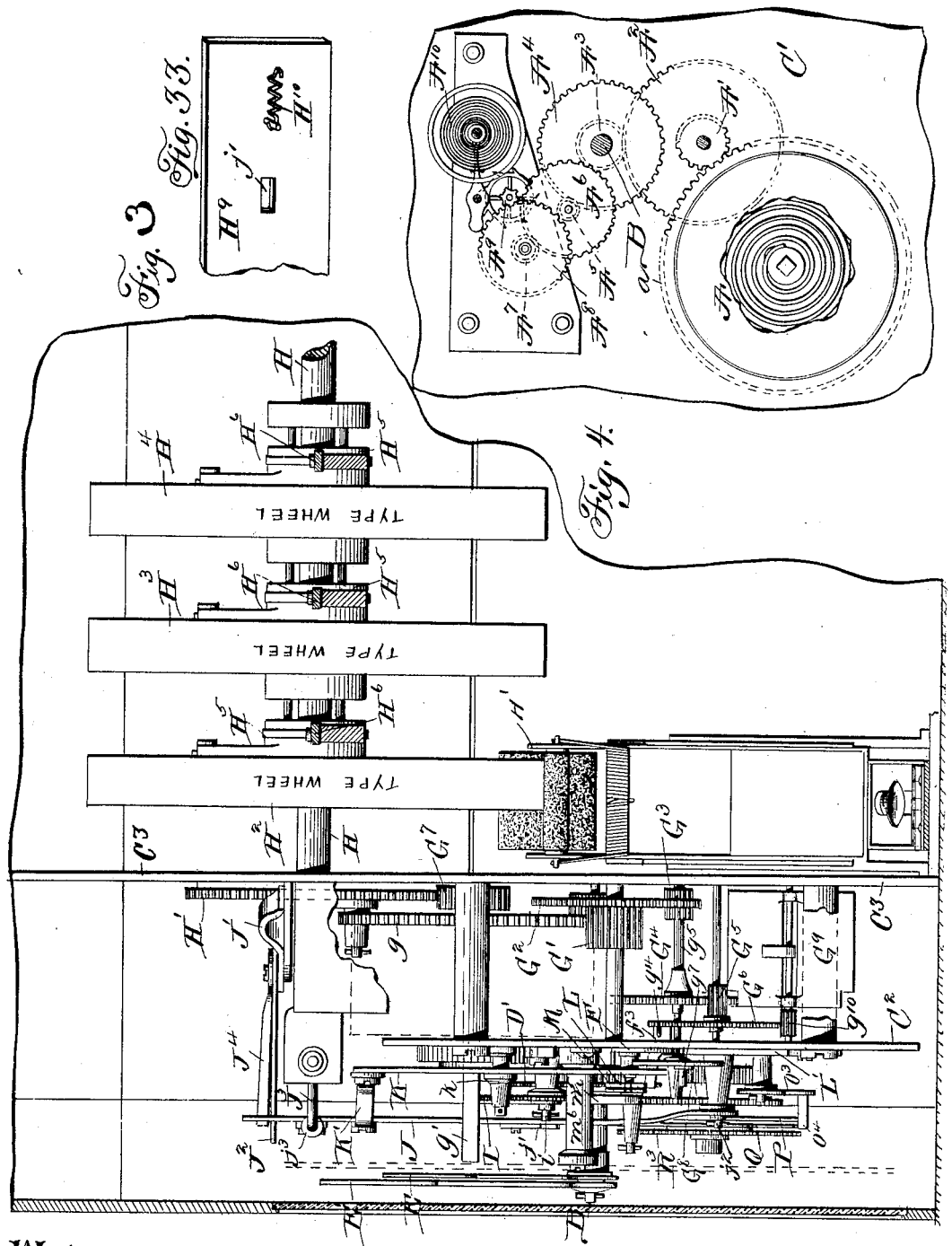
Witnesses:
Chas. W. La Porte
W. H. Edwards
Inventor,
Charles Korfhage
by H. H. Bliss
Att'y.

No. 634,241. Patented Oct. 3, 1899.
C. KORFHAGE.
WORKMAN'S TIME RECORDER.
(Application filed Nov. 8, 1894. Renewed Feb. 18, 1899.)

(No Model.) 6 Sheets—Sheet 4.

Witnesses:
Chas. W. La Porte
W. H. Edwards

Inventor,
Charles Korfhage
by H. H. Bliss
Att'y.

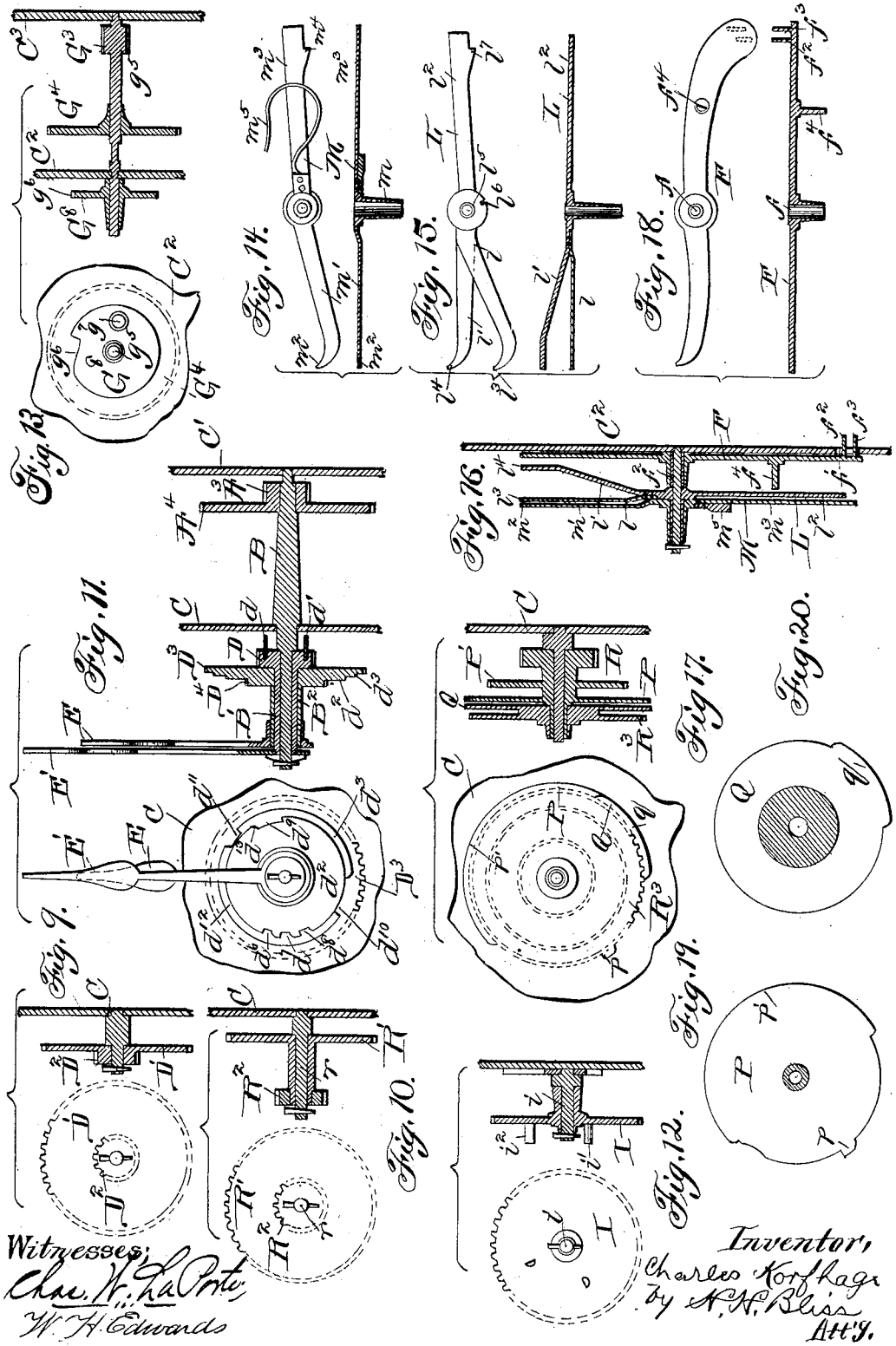

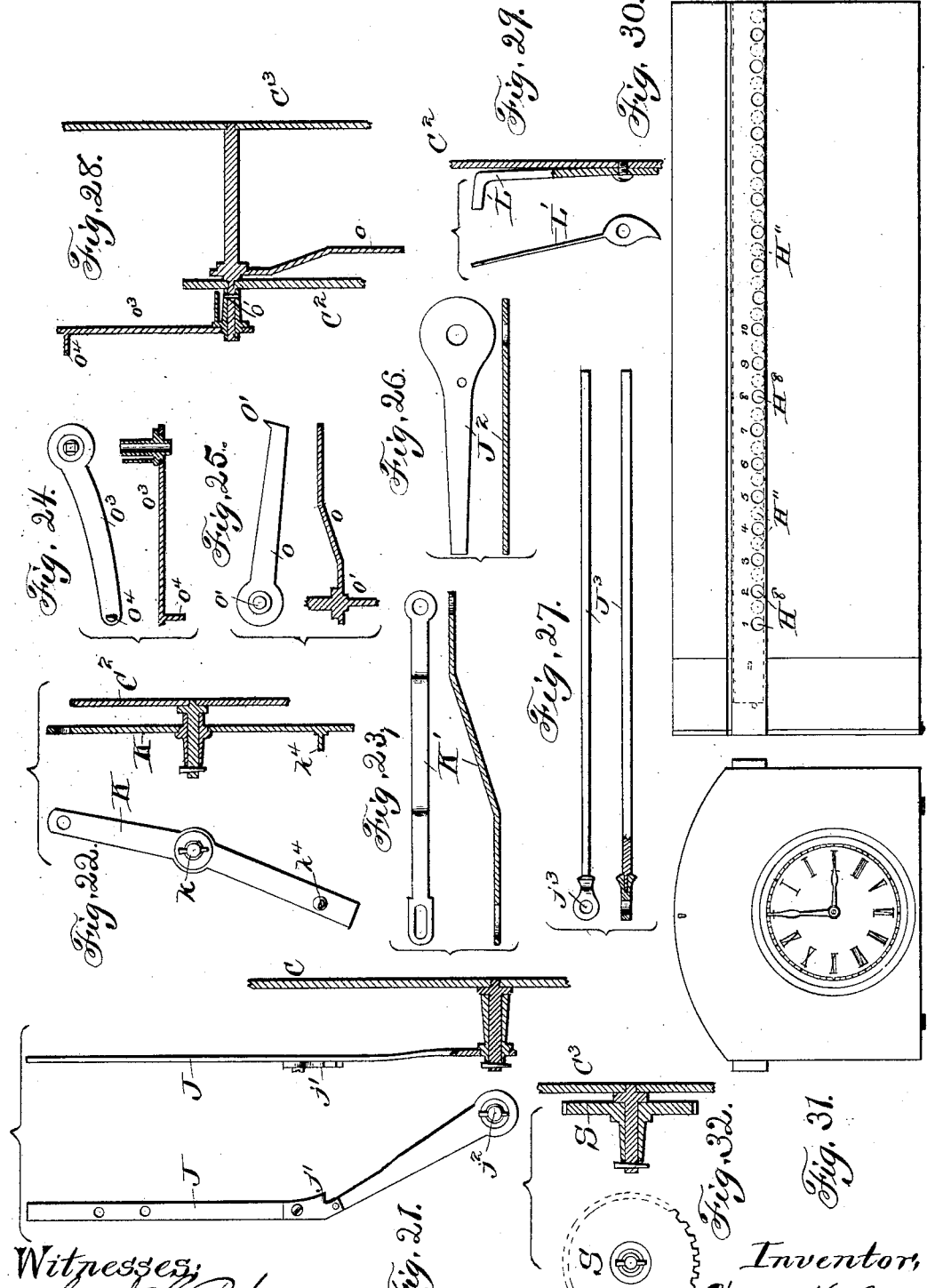

UNITED STATES PATENT OFFICE.

CHARLES KORFHAGE, OF NEW YORK, N. Y., ASSIGNOR, BY MESNE ASSIGNMENTS, TO WILLIAM B. ALLEN, OF TRENTON, NEW JERSEY.

WORKMAN'S TIME-RECORDER.

SPECIFICATION forming part of Letters Patent No. 634,241, dated October 3, 1899.

Application filed November 8, 1894. Renewed February 18, 1899. Serial No. 706,062. (No model.)

*To all whom it may concern:*

Be it known that I, CHARLES KORFHAGE, a citizen of the United States, residing at New York, (Brooklyn,) in the county of Kings and State of New York, have invented certain new and useful Improvements in Time-Recorders; and I do declare the following to be a full, clear, and exact description of the invention, such as will enable others skilled in the art to which it appertains to make and use the same, reference being had to the accompanying drawings, and to the letters of reference marked thereon, which form a part of this specification.

Figure 8:
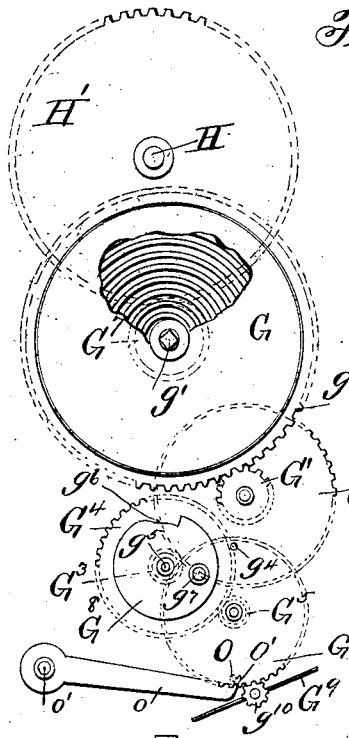
Figure 5:
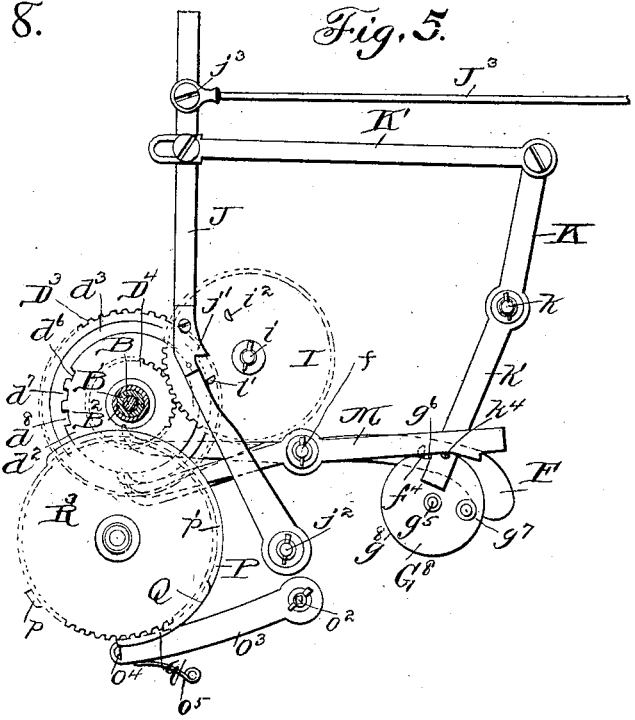
Figure 7:
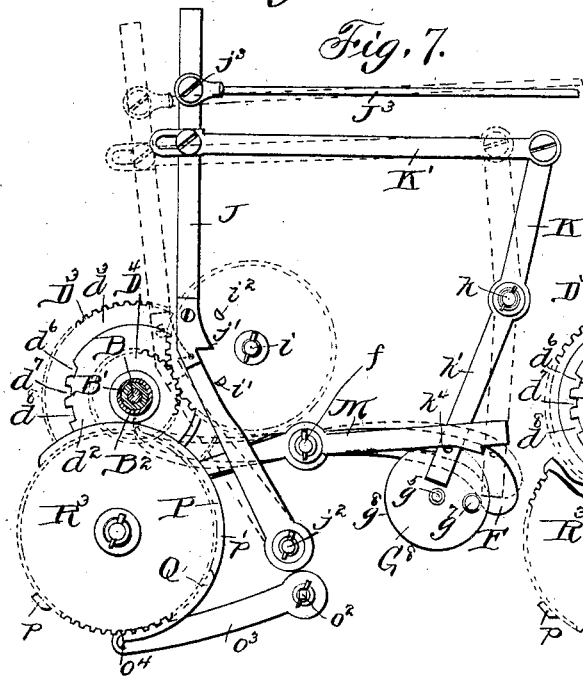
Figure 6:
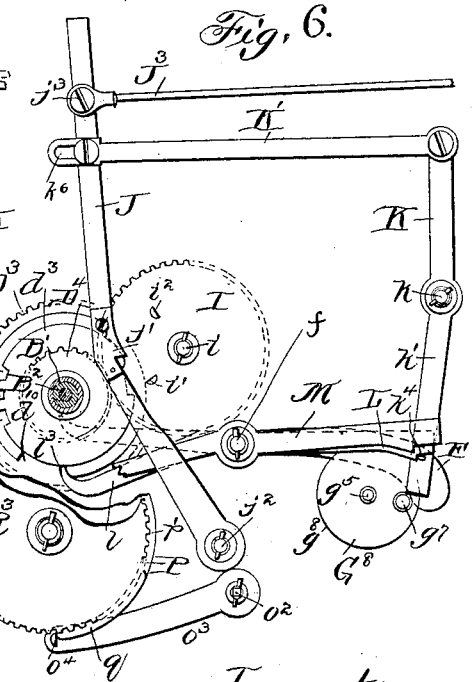

Figure 1 is a face view showing some of the parts of a mechanism embodying my invention. Fig. 2 is a plan view showing part of such a mechanism. Fig. 3 is a side elevation of part thereof. Fig. 4 is a front or face view of part of the primary motor or clock mechanism. Fig. 5 is a face view detached of the principal parts of the controlling devices by which the secondary motor is released at intervals and also showing some of the devices which actuate the cover or lock that prevents access to the motors. Figs. 6 and 7 are similar views of the said parts, showing them in other positions. Fig. 8 is a face view of parts of the secondary motor and some of the devices which govern its movements. Fig. 9 is a face view and a vertical section of part of the dial-train of gearing. Fig. 10 is a face view and a vertical section of the gear-wheels which actuate the cam that governs the weekly movements of the recorder-motor. Fig. 11 is a face view and a vertical section of the principal clock-arbor, the gearing thereon, and the dial-hands. Fig. 12 is a face view and a vertical section of the wheel which is actuated by the clock or primary motor for operating the keyhole-cover. Fig. 13 is a face view and a vertical section of the disk which limits the time of each action of the recording-motor. Figs. 14 and 15 each show a face view and a section of one of the levers for controlling the movements of the cover or lock for the keyholes. Fig. 16 is a section of said levers, their arbor, and also of the escapement-lever which governs the recorder-motor. Fig. 17 is a face view and a section of the cam-disk which controls the daily and weekly actions of the motor and also showing the parts mounted on the axis of said cam. Fig. 18 is a face view of a section of the escapement-lever. Fig. 19 is a face view of the disk which governs the daily movements of the recorder. Fig. 20 is a face view of the disk which, in conjunction with the aforesaid, governs the weekly movements of the recorder. Figs. 21 to 29, inclusive, each show in face view and in section levers and details. Fig. 30 is a side view, and Fig. 31 an end view, of a cabinet or casing containing the entire mechanism. Fig. 32 is a face view and a section of one of the intermediate or idler gears by which two of the secondary motors can be connected together. Fig. 33 is a detail view of a portion of the slide for preventing access to the locks.

The mechanism comprises means for making a record, a motor for actuating them, means for permitting the operation of the said motor, and a primary motor for actuating the said means.

In the drawings the primary motor is illustrated as being a clock-movement of the ordinary sort.

At A, Fig. 4, there is a spring barrel or casing containing a spring adapted to be wound by a key and held under tension by the ratchet $a'$ and pawl $a^2$. (See Fig. 1.) The spring-barrel carries a wheel $a$, which rotates a pinion $A'$, (see Fig. 4,) secured to whose arbor is another wheel $A^2$. The latter drives the arbor B of the minute and hour hands through pinion $A^3$. On this arbor there is a larger wheel $A^4$, which rotates the pinion $A^5$, having on its arbor the larger wheel $A^6$, which in turn drives the wheel $A^7$. The latter rotates the wheel $A^8$, which engages with the pinion $A^9$, and the latter actuates the escapement-wheel pallets and balance-spring at $A^{10}$.

The gearing and shafting above described are mounted in and situated between the front and back plates C C' of the clock-movement. The arbor B projects through the front plate C and carries the sleeve B', as shown in Fig. 11, secured to the pinion D, and the sleeve $B^2$, secured to the wheel $D^3$. The hour-hand E is secured to the sleeve $B^2$ and the minute-hand E' to the sleeve B'. The pinion D drives the dial-train of gearing, consisting of the wheel D' and the pinion D², which gears back to the aforesaid wheel D³, the speeds being in the usual ratio.

I have above referred to parts which may constitute the elements of an ordinary clock.

I utilize the hour-pinion D for effecting the intermitting movements of the recording mechanism.

$d$ $d'$ are two pins or projections secured to pinion D. Any number can be used, according to the desired frequency of the movements of the recorder. Said pinion D is also provided on the opposite face from the said pins $d$ $d'$ with two cam-surfaces $d^2$ $d^3$ for a purpose to be hereinafter described. These pins engage every half-hour with a lever F, (see Figs. 1, 5, 6, 7, and 18,) which is pivoted at $f$, the inner end being elevated and the outer end depressed. Lever F carries one or more inwardly-projecting fingers or plate-lugs $f^2$ $f^3$. These extend through an aperture $f'$, (see Fig. 16,) formed in the outer wall or plate C² (see Fig. 16) of the secondary motor, there being a corresponding inner plate or wall at C³. They act to stop and release the secondary motor, as follows: This motor comprises a driving-spring at G, (of any preferred sort,) with a winding-arbor $g'$ and having a barrel with a toothed wheel $g$. The latter drives a pinion G', on the arbor of which is a wheel G². This wheel engages with a pinion G³ on arbor $g^5$, which also carries the wheel G⁴, meshing with pinion G⁵ on a supplemental arbor, and on which arbor is the escapement-wheel G⁶. This wheel has a stop at $g^4$, adapted to engage with the above-described arms or projections at $f^2$ $f^3$ on lever F. When the lever F is moved to take the parts $f^2$ $f^3$ away from stop $g^4$, the secondary motor is released and the spring G acts to set the various wheels and arbors of that motor in revolution. On the spring-arbor there is a pinion G⁷, which directly imparts the power and movement to the record devices.

H is a shaft of any desired length passing from the front to the rear of the plate C³ and extended backward any desired distance, this being the shaft or arbor on which the type-wheels or record devices are mounted. It has a wheel H', engaging with wheel G⁷, and whenever the stop $g^4$ of the secondary motor is released by the disengagement of lever F and the pinion G⁷ is moved a small fraction of a revolution will be imparted to wheel H' and the shaft H.

Now the shaft H can be utilized as the support or driver for record devices of any suitable sort. At present I prefer and have shown as combined therewith type-wheels H² H³ H⁴ of the general character of those in the time-recorder of John W. Poler shown in Letters Patent No. 547,156, dated October 1, 1895, each of these wheels having an inking mechanism H¹⁵, a paper-feed, and a clutch at H⁵ for connecting and disconnecting the wheel with and from the shaft H.

At H⁶ there is a clutch-lever which can be actuated through a lock (not shown in detail) situated at H⁷. Access to the lock is permitted through a keyhole H⁸. (See Fig. 30.) If each type-wheel is appropriated by some individual, he is furnished with a special key for the lock H⁷, by which he can move the lever H⁶ and the clutch H⁵ to connect and disconnect the record-wheel H² or H³, &c. The said Poler time-recorder being illustrated in the patent referred to, it is unnecessary here to illustrate or describe it in detail. It is sufficient to note that it is desirable to impart a fraction of a revolution to each record-wheel at the end of each of several predetermined intervals.

By the mechanism above described the recorder-shaft H will be moved every thirty minutes by the secondary motor, its motion each time commencing as soon as the pin $d$ or $d'$ on wheel D of the primary motor or clock moves lever F down at the inner end and up at the outer end to take projections $f^2$ $f^3$ out of the path of stop $g^4$, for thereupon spring G is free not only to turn its pinion G⁷ and shaft H, but also the train of gearing G', G², G³, G⁴, G⁵, and G⁶.

In order to accurately gage the distance which the parts of the secondary motor shall move, and therefore the movements of the shaft H and the recorders, and also to insure that this motion shall at each release continue sufficiently long, I combine with the release-lever F means for holding it away from the stop $g^4$ a predetermined period of time after the secondary motor has commenced its movement. This consists in the mechanism shown of a notched disk G⁸, (see Figs. 8 and 13,) secured to the arbor $g^5$ and situated outside the plate C². When the secondary motor is at rest, the outer end of lever F is in its lower position, it having a pin $f^4$, (see Fig. 18,) which lies in the recess $g^6$ in disk G⁸. When pin $d$ or $d'$ on the wheel D moves lever F, it throws pin $f^4$ out of the notch $g^6$ at the same time that the stop or escapement plates at $f^2$ $f^3$ release the stop $g^4$ on wheel G⁶. Then instantly the secondary motor starts the disk G⁸ to revolving and brings the circular part $g^8$ of its periphery under the pin $f^4$, which holds the latter and lever F up while the secondary motor is in action, and it continues to hold it up during one revolution of disk G⁸ or about eight revolutions of the escapement-shaft or stop-wheel G⁶—that is to say, the stop-pin $g^4$ makes eight revolutions without contacting with the stop-plates $f^2$ or $f^3$; but as soon as arbor $g^5$ and disk G⁸ complete their revolution the recess at $g^6$ comes beneath the pin $f^4$ on the lever F and permits the latter to drop again to bring its stops $f^2$ $f^3$ into the path of stop $g^4$. In this way the movements of the pinion G⁷ and the record-shaft H can be accurately gaged and easily controlled, and by the employment of intermediate gearing and arbors such as described I am enabled to employ a powerful spring at G to operate a large number of recording devices, as at $H^2$ $H^3$, &c., and yet can delicately control the movements of all the parts.

In order to insure uniformity in the rotation of the parts of the secondary motor, use may be made of a fan or flutter wheel, as at $G^9$, driven by the wheel $G^6$ through a small pinion $g^{10}$.

I have now followed the essential parts by which the clock mechanism or primary motor at every half-hour removes the stop or escapement lever from the secondary motor to permit it to drive the record devices for a measured period, and during that period any one of the individual record-wheels $H^2$ $H^3$ will be moved if its proprietor has theretofore clutched it to the shaft H; but it is desirable to prevent the proprietor from so clutching or starting his wheel until the arrival of a predetermined instant, and I provide mechanism for accomplishing this. For instance, the mechanism which I have described can be employed with recording devices to indicate the time during which each of numerous operatives is at work—that is, the hour of his commencing and the hour of his stopping—which is desirable in factories, shops, &c. Suppose that it is desired to permit such operatives to indicate the time of their commencing work, provided they do so before a certain hour, but that if they fail to enter appearance till after such hour they shall not be entitled to enter at all. I have provided mechanism for attaining this end, as follows: The keyholes $H^8$ are normally closed by a locked slide-plate $H^9$, which is held in normal position by a spring $H^{10}$. In this slide there are apertures $H^{11}$, one for each keyhole $H^8$. When the slide is drawn outward, the apertures $H^{11}$ and keyholes $H^8$ coincide and the operatives have access to their locks $H^7$, respectively; but when the slide is in the inner position they are barred out.

Now if it be assumed that the employer plans to allow those operatives to enter appearance and start their respective records who have arrived between, say, 6.45 o'clock a. m. and 7.02 a. m. for the morning and between 12.45 o'clock p. m. and 1.02 p. m. for the afternoon and that no others can enter appearance his purpose is carried out as follows:

J' is a lever engaging with the lock-slide $H^9$, it being seated in an aperture $j'$ therein and being pivoted at $j$, (see Fig. 2,) so that it can swing.

$J^2$ is an arm secured to lever J' for operating it.

J (see Figs. 1, 5, 6, and 7) is a vertical lever pivoted at $j^2$ near the lower part of the clockwork and having its upper end situated to impinge on the arm $J^2$ at times. To move lever J, I employ a wheel I, mounted on a stud $i$ and meshing with the above-mentioned wheel $D^4$ on the hour-arbor B, the wheels being in such ratio that wheel I rotates once in twenty-four hours. It has a pin $i'$, which is arranged to impinge on said lever J and move it in the direction of the arrow, Fig. 1, at about 6.45 a. m. Preferably an adjustable plate $j''$, with a gradual cam-like edge, is secured to the lever J to contact with the pin $i'$. The contacting may commence somewhat before 6.45 a. m.; but the purpose is to have the lever J thrown nearly to the limit of its movement at that moment and held in its outermost position till, say, 7.02 a. m. This moving of lever J in the direction of said arrow and holding it out for twenty to thirty minutes moves arm $J^2$, lever J', and lock-slide $H^9$, the latter being brought to and held in the position where its apertures $H^{11}$ register with the keyholes $H^8$, and therefore during this period of time the operatives who appear prior to 7.02 a. m. can insert their keys and connect their record mechanisms, respectively, to the driving-shaft H; but at 7.02 a. m. or thereabout the pin $i'$ passes the cam or projection at $j''$ on lever J, and instantly said lever and the lever J' and the lock-slide $H^9$ move to their normal positions under the influence of the spring $H^{10}$, and thereafter it will be impossible to insert any of the keys, the slide-apertures $H^{11}$ no longer registering with the keyholes $H^8$, and I combine with the lock-slide a positive lock, supplemental to the spring $H^{10}$, to prevent tampering therewith, as follows:

$J^3$ (see Figs. 4, 5, 6, 7, and 27) is an arm pivoted to the lever J at $j^3$ and passing loosely through a sleeve $j^4$ and having its end adapted normally to lie behind the end of the lock-slide $H^9$, as at $j^5$. When in such position, it will be impossible to move the lock-slide outward. When lever J commences to move in the direction of said arrow, it first withdraws this stop or lock rod $J^3$, its upper end (that of lever J) not lying directly against the arm $J^2$, but against a spring $J^4$, (see Fig. 2,) secured to arm $J^2$. By the time it has pressed the spring so far that it can begin to impinge on arm $J^2$ it has drawn the lock-rod $J^3$ away from the slide $H^9$, so that its further movement (that of lever J) can cause the swinging of arm $J^2$ and lever J' and the outward movement of the lock-slide $H^9$—that is to say, under the assumption given the mechanism so far described provides for opening the lock-slide $H^9$ at 6.45 a. m. and holding it open till 7.02 a. m. and for closing it at 7.02 a. m. and positively fastening it thereafter. This positive fastening of the lock-slide $H^9$ will continue until the next pin $i^2$ on the wheel I reaches the lever J or the cam projection $j'$ thereon, and this in the construction shown is timed to occur at about 12.45 p. m., at which time the actions above described again occur—that is to say, the operatives have access to their locks, respectively, until about 1.02 p. m., at the close of the noon-hour.

Those operatives who in the morning gained access to their locks and record devices prior to 7.02 a. m. had a record produced or indicated at every half-hour beginning at 7.30 a. m. up to and including 12 m., and similar records can be produced or indicated at every half-hour during the afternoon for those entering appearance prior to 1.02 p. m.

Now let it be assumed that it is the plan of the employer or of the establishment to allow the operatives to enter appearance not only during the periods above described, (6.45 to 7.02 a. m. and 12.45 to 1.02 p. m.,) but also during brief periods at other times in the morning. For instance, assume it to be the desire that those not entering before the lock-slide $H^4$ closes at 7.02 a. m. should have opportunity to do so between 7.30 and 7.33 a. m. and those failing to enter by that time should have opportunity between 8 a. m. and 8.03 a. m. and that those still failing to appear at that time should have a final opportunity at from 8.30 a. m. to 8.33 a. m., it can be accomplished as follows:

K (see Figs. 1, 5, 6, and 7) is a lever pivoted at $k$ to the plate $C^2$. It is connected by a link K' to the aforesaid lever J, and its lower part $k'$ extends down to and partly across the face of the above-described disk $G^8$ on the secondary motor. This disk has a pin $g^7$, which is adapted at each revolution to strike the lower end $k'$ of lever K and rock it in such way as to open the slide $H^9$; but if nothing else is provided the slide and the levers J and J' will instantly return to their normal positions under the influence of the spring $H^{10}$. To provide means for holding the lever K in its outermost position after being moved thereto by the pin $g^7$, I furnish the lever K with a pin $k^4$ and interpose between these parts and the first above-described cams $d^2 d^3$ (on hour-arbor B of the primary motor or clock) levers L and M. Lever L (see Figs. 15 and 16) is pivoted on a stud at $l^5$ and has two inwardly-extending arms $l$ and $l'$, the latter being above the former and adapted to be impinged on by the pins $d\ d'$ on wheel D, while the arm $l$ inclines downward and has its point $l^3$ resting against the peripheral edge of the cam $d^2$.

L', Fig. 1, is a spring engaging with the lever L by a socket at $l^6$, Fig. 15, and acting to press the inner arms $l\ l'$ up. The outer arm $l^2$ is provided with a stop or shoulder at $l^7$, adapted to engage at certain times with the aforesaid pin $k^4$ on lever K. Normally the lever L is held so that the outer part $l^2$ is up, and therefore when pin $g^7$ swings lever K the stops $k^4$ and $l^7$ do not contact, but lever K immediately returns to the position in Fig. 1; but at certain times (with the mechanism shown at 7.30, 8, and 8.30 a. m. and 1.30 p. m.) lever K can be prevented temporarily from so returning, as follows: By examining the cam $d^3$ on wheel $D^3$ on arbor B (see Figs. 6 and 11) it will be seen that it has two recesses or notches $d^{10}$ and $d^{11}$. These are so timed that the recess $d^{10}$ reaches or comes over the end $l^3$ of lever L at, say, 7.20 a. m., and the recess is of such length as to be over $l^3$ till, say, 8.50 a. m. During this period the lever L is ready to rock (the inner arms $l\ l'$ up and the outer arm $l^2$ down) under the tension of the spring L'; but it is prevented from so rocking by a pin $k^4$ on lever K (which lies under lever L) till 7.30. At 7.30 the lever F is moved by pin $d'$, as above described, and releases the stop-wheel $G^6$ of the secondary motor, and the record-shaft H is moved a step and the disk $G^8$ is rotated once. This disk just before completing its revolution carries its pin $g^7$ against lever K and moves it outwardly at the bottom, the pin $g^7$ escaping from this lever K just as the disk $G^8$ comes to rest; but lever K cannot swing back, because spring L' has rocked lever L, the notch $d^{10}$ permitting arm $l'$ to move up and throwing arm $l^2$ down, whose stop $l^7$ drops behind pin $k^4$ on lever K in time to catch it, and the lever K is held temporarily out, and it in turn through link K' holds the parts J, $J^2$, J', and $H^9$ in their open positions, permitting keys to be introduced through apertures $H^{11}$ and keyholes $H^8$. This occurs, as said, for instance, at 7.30 a. m., (and other times to be described,) and the lever K is held in its outer locked position for three minutes; but at 7.33 a. m. the pin $d'$ (which three minutes previously struck lever F and tripped the secondary motor) strikes the end $l^4$ of inner arm $l'$ of lever L and presses it down a little, which elevates the outer arm $l^2$ far enough to take stop $l^7$ away from pin $k^4$, and thereupon lever K is unlocked, and the spring $H^{10}$ through the parts $H^9$, J', $J^2$, J, and K' throws lever K to its inactive position, as in Fig. 1, the same spring $H^{10}$ at the same time again closing the lock-slide $H^9$ over the keyholes.

During the three minutes last referred to while lever K was held out by pin or lug $l^7$ and while said lever held the lock-slide $H^9$ open entrance could be made to their record devices by those operatives who had not entered between 6.45 and 7.02 and who had come between 7.02 and 7.30; but they could not get entrance to their records until after the half-hour-recording action at 7.30 had occurred in behalf of those operatives who had entered at the earlier period—that is to say, at 7.30 the secondary motor first accomplishes the recording of the half-hour and lastly causes its pin $g^7$ to open the lock-slide $H^9$ through lever K. Hence confusion is avoided and a well-defined separation of the recording acts of the mechanism can be maintained. Those operatives who did not enter during the said three minutes from 7.30 to 7.33 must wait until an instant after 8 a. m. At 8 the last-described operations and relations of parts again occur, for, as above said, the notch $d^{10}$ does not travel entirely away from end $l^3$ of arm $l$ till about 8.50. Therefore when the pin $d$ at 8 o'clock trips lever F and starts the secondary motor and the pin $g^7$ at the end of its revolution moves the lower end of the lever K out again spring L' is free to throw arm $l$ up and arm $l^2$ down to have the stop $l^7$ lock the pin $k^4$ and hold open the lock-slide $H^9$ for three minutes. At 8.33 pin $d$ strikes end $l^4$ of lever L and raises stop $l^7$, whereupon the lock-slide $H^9$ is again thrown to the closed position. At 8.30 occurs the final holding open of the lock-slide H⁹, this action being again caused in the way last described, and at 8.33 occurs the final closing of the slide, because at 8.50, as aforesaid, the recess $d^{10}$ in wheel $d^3$ has passed beyond end $l^3$ of lever L, and $l^3$ thereafter rides on the circular surface at $d^{12}$, so that it is impossible for the outer arm $l^2$ of lever L to rock down under tension of spring L'. Therefore at 9 o'clock, when the secondary motor is tripped by pin $d$ and lever F and moves the record devices one degree and revolves disk $G^8$ once and the pin $g^7$ swings lever K out, the latter is not caught or locked, but instantly snaps back, so that the lock-slide H⁹ is not held open. Therefore no operatives can get access to their locks or records.

The last-described actions occur also at 9.30 and at every half-hour thereafter up to and including 12 m.—that is to say, at every half-hour the secondary motor is tripped and actuates the record devices, but only for the benefit of operatives who started their record prior to 8.33 a. m.

I will now refer to the parts and their relations and operations which come more particularly into play at about the noon-hour—say from 11.55 a. m. to 1.30 p. m.—and let it be assumed that it is desired to effect the making or indicating of a final morning record at twelve m., and that thereafter no record shall be made or indicated until 1.30 p. m. for the benefit either of those operatives who were present during the morning or who may present themselves at noon, and, again, that it is desired to permit free access to the locks and record devices from 12 m. to 1.02 p. m., either for turning on or turning off the record devices. To accomplish the first purpose, the action of the secondary motor and of the record mechanism must be prevented at 12.30 and 1 p. m. For effecting this there is another stop at O (see Fig. 8) on the scape-wheel G⁶. O' is a swinging stop adapted to catch stop O and hold the secondary motor even though the above-described lever F be raised at the half-hour. Stop O' is carried by an arm $o$, pivoted at $o'$, and secured to an arm or crank $o^3$, provided with a pin $o^4$. A spring $o^5$ (see Fig. 1) normally holds arm $o^3$ up and arm $o$ down, this spring pressing pin $o^4$ against the periphery of a cam-disk P. Disk P rotates once in twenty-four hours, it having a wheel P' meshing with the aforesaid wheel D³ on the hour-arbor B. Disk P has a short cam $p$ and a relatively longer one at $p'$, each adapted to bear on pin $o^4$ and push it down and throw up stop O' in front of stop O. Now the parts are so timed that the short cam $p$ a few moments after twelve m. (and after the final recording action of the secondary motor at that hour) engages with the pin $o^4$ and thereby raises stop O', and the length of this cam $p$ is such that it holds stop O' up till about 1.15 p. m. Therefore at 12.30 the secondary motor cannot act even though pin $d'$ moves lever F, for stop O' is directly in front of stop O and holds the scape-wheel G⁶ stationary. This is also true at one p. m. Consequently no operative is credited with any record after the one occurring at twelve m.; but according to the second assumption above it is desirable for some operatives to throw out their record devices—for instance, those who will be absent during the afternoon—and also desirable that those who newly arrive during the noon-hour should have access to their locks and start their record, respectively; or, in other words, it is desirable to hold the lock-slide H⁹ open from a few seconds after 12 till, say, 1.02 p. m. To accomplish this, two devices (not yet referred to) are employed. $i^2$ is another pin on the aforesaid wheel I, so set that at about 11.55 a. m. it reaches lever J and begins to bear on the lock-slide H⁹; but its movement is slow and does not reach the full opening position until about 12.55; but in the meantime—to wit, a few seconds after twelve—the lock-slide H⁹ has been fully opened by the pin $g^7$ and lever K, for it will be remembered that at twelve o'clock there is a movement of the secondary motor, for record purposes, ending with a contact of pin $g^7$ against lever K and an outward swinging of the latter to open slide H⁹, and the lever K is locked in its out position by a lever M somewhat similar to the lever L and mounted on the same stud $m$, the two levers lying parallel and side by side; but lever M has its inner arm $m'$ and its end $m^2$ in the plane of the other cam $d^2$ on arbor B. The outer arm $m^3$ has a stop $m^4$, adapted to engage at times with the aforesaid pin $k^4$, this stop $m^4$ being more or less similar in shape, position, and function to that at $l^7$. A spring $m^5$, secured to lever M and bearing against a stud $m^6$, normally presses the outer arm $m^3$ down and the inner at $m'$ $m^2$ up. The said cam $d^2$ has recesses which at times permit the spring to move the end $m^2$ up, these recesses being indicated by $d^6$, $d^7$, $d^8$, and $d^9$. The timing is such that recess $d^9$ comes above end $m^2$ of lever M at about 11.55 a. m.; but spring $m^5$ cannot yet rock the lever M, because pin $k^4$ is below its outer end, (see Fig. 1;) but at twelve m., when the final morning recording action occurs and lever K is moved out by pin $g^7$ at the end of the recording action, the lever carries its pin $k^4$ beyond the stop $m^4$ on lever M, and then spring $m^5$ snaps arm $m^3$ down, so that said stop $m^4$ catches pin $k^4$, and lever K is locked in its outer position, and lock-slide H⁹ is held open. The length of recess $d^9$ is such that lever M will be held in this position until about 12.55 p. m., at which time the end $d^{13}$ of recess $d^9$ reaches end $m^2$ of lever M, and the peripheral part of the disk $d^2$ forces arm $m'$ down and stop $m^4$ up, whereupon lever K is free to move a short distance, far enough to carry its pin $k^4$ inside of stop $m^4$, (because of the slot connection at $k^6$, between link K' and lever J,) but not far enough to close the lock-slide H⁹. The lock-slide is still held open at this particular time, (from about 12.55 p. m. to 1.02 p. m.,) from the fact that pin $i^2$ is now bearing full on the point of the cam edge $j'$ on lever J, so that that lever and the parts at $J^2$, $J'$, and $H^9$ are still held open, notwithstanding the release of lever K from stop $m^4$ on lever M. The pin $i^2$ is timed to pass cam $j'$ at 1.02 p. m., whereupon lever J is released and spring $H^{10}$ closes the lock-slide $H^9$. Those operatives who have not entered appearance by 1.02 p. m. are barred out till 1.30. At about 1.15 p. m. the above-described cam $p$ has passed beyond pin $o^4$, and the latter, under tension of spring $o^5$, moves up against the inner periphery of cam-disk P, thereby swinging stop $o'$ out of the path of stop O, after which the scape-wheel $G^6$ is ready to permit the secondary motor to actuate the recorder as soon as lever F is raised, and this raising of lever F is accomplished in due course at 1.30 by pin $d'$, as above described. Shortly before 1.30 p. m.— say about 1.20—the recess $d^{11}$ in the aforesaid cam-disk $d^8$ on arbor B comes over the end $l^3$ of lever L, before referred to, to prepare for said lever L locking the lever K at the end of the recording action at 1.30, this locking being the same as has been fully set forth and effected by the stop $l^7$ engaging with the pin $k^4$ at the end of the revolution of the disk $G^8$, and the lever K and the slide $H^9$ are held open for three minutes to give operatives an opportunity for inserting their keys into their respective locks. At 1.33 the pin $d'$ trips arm $l^4$ of lever L and raises stop $l^7$, releasing lever K and closing the lock-slide $H^9$. From this time (1.33 p. m.) till 5 p. m. no actions occur except those at the successive half-hours of tripping the secondary motor and making or indicating the periodic record; but I provide for permitting operatives to enter their locks and disconnect their record devices during a period of five minutes at 5 o'clock, ten minutes at 5.30, and twenty minutes at 6 o'clock—that is to say, open the lock-slide $H^9$ from 5 p. m. to 5.05, from 5.30 to 5.40, and from 6 to 6.20—and without interfering with the half-hour-recording action, as follows: Shortly before 5 p. m.— say at 4.50—the recess $d^6$ in cam-disk $d^2$ comes over the end $m^2$ of lever M, so that when the secondary motor is tripped at 5 p. m. and the disk $G^8$ makes its revolution the lever K will be locked by the stop $m^4$, as end $m^2$ can rise into the said notch $d^6$. This notch or recess is comparatively short, and the end wall thereof at about 5.05 engages with the end $m^2$ of lever M and throws it down, releasing stop $m^4$ from lever K, whereupon the lock-slide $H^9$ is closed. During the five minutes at which it was open there was opportunity for operatives to insert their keys and disconnect the clutches at $H^5$ to stop their record devices for the day. Then at 5.30 substantially the same operation is performed, (at the end of the recording action,) the recess $d^7$ having moved to a position above the end $m^2$ of lever M and permitting it to lock lever K. This recess can be somewhat longer than that at $d^6$, and therefore the lock-slide $H^9$ will be held open longer—say for ten minutes, from 5.30 to 5.40—and at 6 p. m. the same results are attained because of the recess $d^8$ having reached the end $m^2$ of lever M, and this recess may be still longer than the others, so that the lock-slide will be held open for, say, twenty minutes, or from 6 to 6.20. When the lock-slide is at this time returned to its closed position, it is the final action for the day and the succeeding night of all the parts above described except the lever F (which it is not desirable to disconnect from the arbor-pins $d\ d'$)—that is, there is no further action during the remainder of the day and the succeeding night of the recording devices, the secondary motor, the lock-opener, &c.

The above-described cam-disk P has a comparatively long cam $p'$ opposite to the noon-cam $p$, and it is so related and timed that at about 6.15 p. m. it reaches the pin $o^4$, pushing the latter down and throwing the stop $O'$ again in front of stop O on scape-wheel $G^6$, and it (cam $p'$) is of such length as to hold pin $o^4$ down and stop $O'$ up during the night and until about 7.20 the following morning. Therefore the secondary motor and the recording mechanism will be held inactive until 7.30 of said morning, the said parts at $p'$, $o^4$, $o^3$, O, and $O'$ holding it till 7.20 and the lever F, with stops $f^2\ f^3$, holding it till 7.30, at which time the first recording action of the day is desired. At the time of this first recording action those operatives will be automatically credited who entered appearance prior to 7.02, or about one-half hour previously, and the steps for the succeeding day are the same as those above described.

From the above description the manner of preventing entrance into the locks during any night will be understood; but I also provide for preventing such entrance during Sunday. This is accomplished by a supplemental cam-disk Q, arranged to rotate once in a week—for instance, by such gearing as is shown at R, $R'$, $R^2$, and $R^3$. R is a pinion rotating with the aforesaid wheel $P'$ and meshing with wheel $R'$, the latter being mounted on a stud $r$ and carrying a pinion $R^2$, which in turn drives the wheel $R^3$, solid with or secured to said cam-disk Q. This disk has a cam $q$ so related and timed that it shall during Sunday engage with and hold down the pin $o^4$ and prevent the stop $O'$ during that day from dropping out from the path of stop O on scape-wheel $G^6$.

It will be remembered that the daily rotating cam $p'$ holds down the pin $o^4$ and stop $O'$ up from 6.15 Saturday night until 7.20 Sunday morning, and also from 6.15 Sunday night until 7.20 Monday morning. Therefore it is only required that the cam $q$ should be ready to engage with said pin $o^4$ at a suitable time prior to 7.20 Sunday morning and continue to engage with it until a suitable moment after 6.15 Sunday night. I prefer to make this cam long enough to be in action for about thirty hours, more or less, beginning Saturday night and ending early Monday morning, so as to insure that the period of its action shall suitably overlap the periods of the action of the daily cam $p'$.

From the above description, taken in connection with the drawings, I believe that a full understanding can be obtained of the construction and the manner of operating and using the mechanism, and that it is not necessary to again enumerate the different actions and manipulations which are possible at the several periods during the day.

It will be seen that I provide means for producing or indicating a record periodically, means for rendering the record devices inactive at predetermined times, and means for permitting access to the record devices at certain times and preventing access at others.

I have described in detail the construction and arrangement of the parts which I have selected for the illustration of one way of carrying out my invention; but I wish to be understood as not limiting myself to all of such details exactly, as the essential features of the present improvements can be preserved, although numerous modifications can be employed in applying them. The present mechanism provides for allowing operatives to start their recorders at about 7 a. m., 7.30 a. m., 8 a. m., 8.30 a. m., 1 p. m., and 1.30 p. m.; but it will be seen that by varying the number and position of such pins as at $d\ d'$ and such recessed cam-disks as at $d^2\ d^3$ entrance to the recorders can be permitted at more or less frequent times and during longer periods. I have also shown how the governing action of a single and comparatively small primary motor or clock can be applied to an indefinite number of recording devices. The wheel H' on shaft H is connected by the idler-gears S S' to a corresponding wheel H' on a second shaft H, which is adapted to engage and drive another series of recorders. If the power of the secondary motor at G is not sufficient, it can be readily augmented by employing one or more supplemental ones, as at T, the one illustrated being shown as gearing with the second recorder-shaft H. For such additional motors the lock and escapement at F $f^2\ g^4$ will be sufficient, the gearing and shafting at $G^6\ G^5\ G^4$, &c., being sufficient to decrease the leverage of the secondary motors, so that said escapement is sufficiently powerful and durable.

I do not herein claim as of my invention any of the matters shown or described in the application of John W. Poler, filed October 24, 1893, Serial No. 489,025, nor any of the features of construction incident to the recording mechanism herein illustrated or the devices permitting hand-control or key-control of the recording mechanism, as I concede the same to be of the invention of said J. W. Poler; but my improvements are to be clearly distinguished from the mechanism illustrated and described in said application. For example, in the Poler construction referred to means were provided for limiting the movement of the clock-actuated escapement-lever for controlling the movements of the secondary motor, whereby said lever, the secondary motor, and parts connected therewith were held inactive during predetermined periods of time, (during the noon-hour and at night;) but I have found that it is preferable to allow such escapement-lever to have free and full movement at all times, and therefore have provided means (the stops O O') supplemental to said escapement-lever and engaging with the secondary motor entirely independent of any movement of said lever.

I am aware that prior to my invention it has been proposed to construct a time-recorder in which a chart should be intermittingly advanced at regularly-recurring intervals beneath and in position to receive impressions from a series of spring-pressed punches, the said punches being connected with handles or pulls, by which they could be moved away from the recording-chart to compress the springs thereof, which when the handles were released would impel the punches against the chart, making an indentation or perforation therein. Again it has been proposed to provide a recorder which should comprise a time-wheel having upon its periphery a series of numerals corresponding in form and relative location to the divisions on a clock-dial, such wheel being geared to a suitable clock to rotate in unison with the hands thereof, and one or more printing-wheels bearing numbers corresponding to the numbers on the keys in the possession of the operatives. An operative by inserting his keys in a guideway provided for that purpose would turn the printing-wheel until the number on the periphery thereof corresponding to the key belonging to him was in alinement with the numeral on the time-wheel which at that moment was in position to make a record. When the parts were in this relation, an impression from the time and operatives wheel was made upon a suitable tape. With such mechanism was also combined a lock for preventing access to the recording mechanism except at predetermined times.

I make no claim to either of the constructions referred to, but my improvements are clearly distinguishable from either of them.

In neither of the said earlier constructions was the recording mechanism automatically actuated from the motor; but in both the only record made was effected by manual operation of some of the parts.

In the construction first referred to the operating devices were exposed and adapted to be operated at any time, whereas in my improvements the operatives can only obtain access to the recording mechanism at certain predetermined intervals, and with the other of such prior constructions the recording mechanism was inoperative and stationary except when a key was inserted in the passage provided therefor. By my construction, however, the recording mechanism is stationary when the passage leading thereto is open, and the record made by such mechanism is a continuous one, made while the said passage is closed, instead of one made only at the time a key is inserted.

By my improvements it is possible to tell at any instant, on inspection of the record, the amount due each operative, whereas by the prior constructions referred to the record presented only the hour of beginning and ceasing work, and it was necessary for the timekeeper to make the calculations necessary to determine the amount due.

What I claim is—

1. The combination with the recording device, of the clock or primary motor, the secondary motor, the clock-actuated escapement for the secondary motor, and means supplemental to the escapement for locking the secondary motor at predetermined times, substantially as set forth.

2. The combination with the recording mechanism, of the clock or primary motor, the secondary motor, means actuated by the primary motor for releasing the secondary motor, a supplemental lock for the secondary motor, and two sets of differently-timed devices for closing and opening the said lock, substantially as set forth.

3. The combination with the recording mechanism, of the primary motor or clock, the secondary motor, two independent locks for the secondary motor, and two sets of lock-operating devices, both actuated by the primary motor, substantially as set forth.

4. The combination with the recording mechanism, of the primary motor or clock, the secondary motor, two locks for the secondary motor, one adapted to be moved out of the locking position by the primary motor, and one adapted to be moved by said motor into the locking position, substantially as set forth.

5. The combination of the recording mechanism, the prime motor, the secondary motor for actuating said recording mechanism, a lock for holding the motor stationary, means controlled by the prime motor for automatically releasing said lock from the recording-motor, and means for positively engaging and holding the lock out of engagement with the secondary motor for a predetermined period of time after its release by the prime motor and during which the recording mechanism is automatically actuated by the motor, substantially as set forth.

6. The combination with the recording mechanism and the motor therefor, of the lock for the motor, means for releasing the lock, and the notched disk $G^8$ for holding the lock open during a predetermined number of revolutions of said disk, substantially as set forth.

7. The combination of the recording mechanism, a motor for actuating said mechanism, a locking-lever adapted to prevent said motor from moving, means for releasing said lever from said motor, and a disk, $G^8$, geared to said motor and provided with a cam for holding said lever out of engagement with the motor for a predetermined period of time whenever said lever is released from said motor, substantially as set forth.

8. The combination of recording mechanism, a motor for actuating said mechanism, a lever adapted to engage with said motor to lock the motor against movement, means for releasing said motor, and a disk geared to said motor and having a notch or recess, to receive a pin or stud on the said lock-lever when said lever is in engagement with the motor, and a cam-surface adapted to hold said lever out of engagement with said motor for a predetermined period of time when the lever is moved from engagement with the motor, substantially as set forth.

9. The combination of the recording devices, the prime motor, the secondary motor for actuating the recording mechanism, an escapement-lock for holding the secondary motor stationary, means controlled by the prime motor for releasing said secondary motor from the escapement-lock at regular intervals, and a disk geared to the secondary motor and having a peripheral cam adapted to engage with said escapement-lock and hold the same out of engagement with the secondary motor for a predetermined period of time whenever said lock is actuated by the prime motor, substantially as set forth.

10. The combination of the recording mechanism, the prime motor, the pinion D geared to the prime motor and having the laterally-projecting pins, $d$ $d'$, the secondary motor for actuating the recording mechanism and having an escapement-wheel, $G^6$, having a laterally-projecting stop-pin, $g^4$ and an escapement-lever, F, having one end extending into the path of the pins $d$ $d'$, on said pinion D and having laterally-projecting pins, $f^2$, $f^3$, adapted to engage with said stop-pin, $g^4$ on the escapement-wheel of the secondary motor, substantially as set forth.

11. The combination with the recording mechanism, of the motor therefor, means for intermittingly releasing the motor at equal intervals throughout the day, and means supplemental thereto for preventing the motor from acting at certain predetermined intervals of those aforesaid, substantially as set forth.

12. The combination with the recording mechanism, of the motor therefor, a lock for said motor, means for releasing said lock at uniform intervals throughout the day, a second lock for the motor, and means for actuating the second lock at irregular intervals throughout the day, substantially as set forth.

13. The combination with the recording mechanism, of the motor therefor, means for releasing the motor and actuating the recording mechanism at predetermined times, the stop O', and the cams $p$ and $p'$ which actuate said stop O' for locking the motor against movement, substantially as set forth.

14. The combination with the recording mechanism, of the motor therefor, the lock for positively stopping the motor, means for releasing the lock at predetermined times, the disk P having the cams $p$ and $p'$, and the stop O' forming a supplemental lock for the motor, and adapted to be actuated by said cams, substantially as set forth.

15. The combination with the recording mechanism, the motor therefor, and the clock mechanism supplemental to said motor, of means actuated by the clock for releasing said motor at predetermined times to automatically actuate the recording mechanism, and means substantially as described, timed from the clock mechanism, for locking said motor and thereby the recording mechanism against movement at noon and during the night, substantially as set forth.

16. The combination with the recording mechanism, of the motor therefor, the clock mechanism, the lock for the motor actuated by the clock mechanism at uniform intervals continuously, the supplemental lock for the motor, a daily acting device for holding said supplemental lock closed, and a second weekly acting device for holding said lock closed, substantially as set forth.

17. The combination of the recording devices, a casing inclosing said mechanism and having a passage for permitting access to such mechanism for manipulation thereof, a clock or primary motor, a secondary motor for actuating the recording mechanism, a lock for controlling access to said passage in the inclosing casing, a stop for holding the secondary motor stationary, means controlled by the primary motor for releasing said stop at regular intervals, and independent means controlled by said primary motor for removing said lock to permit access to the said passage and recording mechanism while said stop is engaging with the secondary motor, substantially as set forth.

18. The combination of the recording devices, a casing inclosing said devices and having a passage permitting access to said recording mechanism, a clock or prime motor, a lock or stop for preventing access to said passage in the casing, a lever J, for moving said stop, having a cam, $j'$, a disk or gear wheel, I, geared to the prime motor and having two or more studs or pins adapted to contact with said cam, $j'$, a disk to rock said lever and remove said stop or lock from said passage, and a secondary motor controlled by said prime motor for actuating the recording mechanism at predetermined times when said stop is in position across said passage, substantially as set forth.

19. The combination with the recording devices inclosed in a locked compartment having a passage permitting access to or manipulation of the recording devices, of a secondary motor for the recording devices, a movable closing device for the said passage, a primary motor for releasing the secondary motor at regular intervals of time of a predetermined number, and means actuated by the secondary motor for opening the said passage-closing device at intervals fewer in number than those aforesaid, substantially as set forth.

20. The combination with the recording mechanism inclosed in a compartment having a passage-way permitting access to the recording mechanism, of a lock-slide extending across the said passage and having formed therein an aperture, a spring for normally holding such slide so that its aperture will be out of line with the passage, a motor for intermittingly actuating the recording mechanism, means connected with the lock-slide and adapted to be actuated by the motor to bring the aperture in said slide into alinement with the passage to the recording mechanism, at predetermined times, and means for holding the recording mechanism stationary while the said passage is open, substantially as set forth.

21. The combination with the recording devices inclosed in a compartment having a passage permitting access to or control of the recording mechanism, a cover or closing device for said passage, a motor for the recording devices, a clock or timing mechanism, means actuated by the clock for opening the said cover or closing device, and means supplemental thereto, for opening the same, actuated by the recorder-motor, substantially as set forth.

22. The combination with the recording devices, and a cover or lock for permitting and preventing access to or control of the recording devices, of a motor for causing the recording devices to make or indicate record characters at intervals, devices for opening or releasing said cover or lock, a stop for holding said mechanism while the lock or cover is open, and a timing mechanism for releasing said stop, substantially as set forth.

23. The combination with the recording mechanism, and a cover or lock for permitting or preventing access to or control of said recording devices, of a lock-opening mechanism, a stop or holder for said opening mechanism, means for moving it in opposition to said stop or holder, and a timing mechanism for releasing said stop, substantially as set forth.

24. The combination with the recording mechanism and the lock or cover for permitting or preventing access to or control of said mechanism, of a clock or primary motor, a secondary motor controlled by the primary motor, an opener for said lock or cover, means actuated by the secondary motor for moving the lock-opener, and means actuated by the primary motor for opening the lock when the secondary motor is inactive, substantially as set forth.

25. The combination of the shaft H, the mechanism actuated thereby, the clock or primary motor, the secondary motor, means controlled by the clock for releasing the secondary motor, the stop O connected to the secondary motor, the stop O', the noon-cam $p$ moved or controlled by the clock, and the means actuated by said cam for moving said stop O', substantially as set forth.

26. The combination of the shaft H, the mechanism actuated thereby, the clock or primary motor, the secondary motor, means actuated by the clock for releasing the secondary motor, a stop as at O on the secondary motor, and opposing stop O' the cam $p'$ actuated or controlled by the clock, and means moved by said cam for actuating the stop O', substantially as set forth.

27. The combination of the shaft H, the mechanism actuated thereby, the clock or primary motor, the secondary motor, means actuated by the clock for releasing the secondary motor, a stop O connected to the secondary motor, an opposing stop O', the cams $p'$ and $q$, and means actuated by said cams for moving said stop O', substantially as set forth.

28. The combination with the shaft H and the parts actuated thereby, of the clock or primary motor, the secondary motor, means actuated by the clock for controlling the movement of the secondary motor, a stop or lock for the secondary motor supplemental to the last said means, a lever for moving said stop, and two differently-speeded cams adapted to actuate said lever both simultaneously and separately, substantially as set forth.

29. The combination with the shaft H and the devices actuated thereby, of the cover or lock $H^9$ for preventing access to said mechanism, the clock or primary motor, the secondary motor, the lever J for opening said lock, a wheel as at I adapted to actuate said lever, and means actuated by the secondary motor for moving said lever, substantially as set forth.

30. The combination of the shaft H, the mechanism actuated thereby, the lock or cover as at $H^9$, for preventing access to said mechanism, a lever for opening the lock, a lever K connected to the aforesaid lever, the motor for rotating shaft H, means actuated by said motor for moving the lever K, and mechanism independent thereof for moving the first aforesaid lever, substantially as set forth.

31. The combination with the recording mechanism having a passage for permitting access thereto, of a lock bar or plate $H^9$ adapted to close said passage, a lever adapted to move said plate to uncover said passage, a stop for normally preventing movement of the plate, and means adapted to automatically remove the said stop and the plate-operating lever successively, substantially as set forth.

32. The combination with the recording mechanism having a passage for permitting access thereto, of a lock bar or plate normally preventing access to said passage, a lever for moving said plate to open said passage, a stop adapted to prevent such movement of the plate, a motor for actuating the recording mechanism, and connections between the motor and said lever and stop, whereby the latter is automatically withdrawn and the lever operated to move the plate at predetermined intervals, substantially as set forth.

33. The combination with the lock bar or plate $H^9$, of the lever J', lever J, the mechanism for moving lever J, the stop-bar $J^3$, and the spring interposed between bar $J^3$ and lever J', substantially as set forth.

34. The combination with the lock bar or plate $H^9$, of the lever J, means for connecting it with said lock-bar $H^9$, the clock or motor for moving lever J, a supplemental motor, the lever K actuated by the supplemental motor and loosely connected to the lever J whereby it can move independently thereof, substantially as set forth.

35. The combination of the cover or locking devices $H^9$, the clock or primary motor, the lever J, means controlled by the lock or cover, a stop $l^7$ for holding the lever, and a tripping device actuated by the clock for releasing said stop, substantially as set forth.

36. The combination with the lock or cover at $H^9$, of the clock or primary motor, the secondary motor, means actuated by the clock for releasing the secondary motor, the mechanism for opening the cover or lock $H^9$, the lever L having a stop for holding the lock-opening devices, and tripping mechanism actuated by the clock for disengaging said lever, substantially as set forth.

37. The combination with the lock or cover at $H^9$, of the clock or primary motor, the secondary motor, means for opening the lock or cover, the lever M adapted to engage with the lock-opening devices, and the tripping devices actuated by the clock for releasing said lever M, substantially as set forth.

38. The combination with the recording devices, of the clock or primary motor, the secondary motor, the escapement or lock lever F actuated by the clock for releasing the secondary motor, and means actuated by the secondary motor for holding said lock-lever F out of engagement with said motor for a predetermined period, substantially as set forth.

39. The combination with the clock or primary motor and the secondary motor, of the lock-lever F actuated by the primary motor for controlling the secondary motor, and the notched disk-wheel $G^8$ connected to the secondary motor and adapted to hold said lever F out of engagement with the secondary motor during a predetermined number of revolutions, substantially as set forth.

40. The combination of the clock or primary motor, the secondary motor, the lock or cover at H⁹, the mechanism for opening said lock, the lever F actuated by the clock for releasing the secondary motor, the means actuated by the secondary motor for holding the said lever F out of engagement with the secondary motor, and the cam-like pin $g^7$ connected with the last said means and adapted to engage with the lock-opening devices, substantially as set forth.

41. The combination of the recording devices, the casing inclosing the recording devices and having a passage through which access can be had to said recording devices, a sliding plate, H⁹, for preventing access to said passage, a prime motor, a secondary motor for actuating the recording devices, a lever F, adapted to hold the secondary motor stationary, means controlled by the prime motor for releasing said lever, F, from the secondary motor, a disk G⁸, geared to the secondary motor and adapted to hold said lever out of engagement with said motor for a predetermined period of time when said lever is actuated by the primary motor, a lever J, connected with the slide H⁹ for controlling access to the recording devices, a disk or wheel, I, geared to the primary motor and adapted to actuate said lever, a supplemental lever, K, connected with the aforesaid lever J, and having one end extending into the path of a pin on the disk G⁸, whereby said levers K, and J, will be actuated whenever the prime motor releases the secondary motor, and a stop controlled by the prime motor for locking the lever K in the position to which it is moved by said disk, G⁸, substantially as set forth.

In testimony whereof I affix my signature in presence of two witnesses.

CHARLES KORFHAGE.

Witnesses:
HENRY PARTENFELDER,
TIMOTHY BOLL.